United States Patent
Koopmans et al.

(10) Patent No.: US 11,135,635 B2
(45) Date of Patent: Oct. 5, 2021

(54) PROCESS FOR BLANKING OF METAL PARTS

(71) Applicant: ROBERT BOSCH GMBH, Stuttgart (DE)

(72) Inventors: Sipke Koopmans, Tilburg (NL); Arjen Brandsma, Tilburg (NL); Giel Rompen, Tilburg (NL); Rob Mutsaers, Tilburg (NL); Ronald Cornelissen, Tilburg (NL)

(73) Assignee: ROBERT BOSCH GMBH, Stuttgart (DE)

( * ) Notice: Subject to any disclaimer, the term of this patent is extended or adjusted under 35 U.S.C. 154(b) by 256 days.

(21) Appl. No.: 16/091,228

(22) PCT Filed: Apr. 5, 2017

(86) PCT No.: PCT/EP2017/025079
§ 371 (c)(1),
(2) Date: Oct. 4, 2018

(87) PCT Pub. No.: WO2017/174215
PCT Pub. Date: Oct. 12, 2017

(65) Prior Publication Data
US 2019/0151926 A1    May 23, 2019

(30) Foreign Application Priority Data
Apr. 5, 2016   (EP) .................................... 16020114

(51) Int. Cl.
*B21D 28/16* (2006.01)
*B21D 28/22* (2006.01)
(Continued)

(52) U.S. Cl.
CPC ............. *B21D 28/16* (2013.01); *B21D 28/02* (2013.01); *B21D 28/22* (2013.01); *H02K 15/02* (2013.01); *H02K 15/024* (2013.01)

(58) Field of Classification Search
USPC .............. 72/333, 363; 83/684, 685; 156/253
See application file for complete search history.

(56) References Cited

U.S. PATENT DOCUMENTS

| 4,738,020 A |   | 4/1988 | Neuenschwander |
| 4,951,537 A | * | 8/1990 | Bennett ................ B21D 45/006 |
|             |   |        | 267/119 |

(Continued)

FOREIGN PATENT DOCUMENTS

| EP | 1 677 924 B1 | 12/2007 |
| EP | 2 042 249 A1 | 4/2009 |

(Continued)

OTHER PUBLICATIONS

Takuya et al—WO 2011077557A1—Translated Sep. 4, 2020 (Year: 2011).*

(Continued)

*Primary Examiner* — Debra M Sullivan
*Assistant Examiner* — Matthew Kresse
(74) *Attorney, Agent, or Firm* — Nixon & Vanderhye

(57) ABSTRACT

Disclosed is a process for the blanking of metal parts, in which a multi-layered basic material with a number of mutually stacked, preferably essentially identical, individual layers is placed and clamped partly between a blanking die and a blank holder and partly between a blanking punch and a counter punch and wherein the blanking punch and the counter punch that are moved relative to the blanking die and the blank holder over a distance corresponding to at least (Continued)

a thickness of the multi-layered basic material whereby several blanked parts are cut and separated from the multi-layered basic material.

13 Claims, 4 Drawing Sheets

(51) Int. Cl.
*H02K 15/02* (2006.01)
*B21D 28/02* (2006.01)

(56) References Cited

U.S. PATENT DOCUMENTS

| | | | |
|---|---|---|---|
| 10,392,687 B2 * | 8/2019 | Prevond | B32B 15/20 |
| 2009/0165525 A1 | 7/2009 | Schlatter et al. | |
| 2019/0099800 A1 * | 4/2019 | Senda | H01F 41/02 |

FOREIGN PATENT DOCUMENTS

| | | | | |
|---|---|---|---|---|
| JP | S52 126704 A | | 10/1977 | |
| JP | S57 156657 A | | 9/1982 | |
| JP | H08 300061 A | | 11/1996 | |
| JP | 2005191033 A | * | 7/2005 | |
| JP | 2011 056549 A | | 3/2011 | |
| JP | 2012 115893 A | | 6/2012 | |
| SU | 776916 B | * | 8/1979 | B21D 28/14 |
| WO | WO-2011077557 A1 | * | 6/2011 | B21D 35/007 |

OTHER PUBLICATIONS

Antipin et al—SU 776916A1—Translated Aug. 14, 2020 (Year: 1979).*
Koji et al—JP 2005191033A—Translated Aug. 26, 2020 (Year: 2005).*
International Search Report, dated Jul. 26, 2017, from corresponding PCT/EP2017/025079 application.

* cited by examiner

PROCESS FOR BLANKING OF METAL PARTS

BACKGROUND OF THE INVENTION

Field of the Invention

The present disclosure relates to a process and a device for the blanking of metal parts. The blanking process and device are, as such, well-known and are broadly applied in the manufacturing of metal parts, in particular for the cutting-out thereof from strip, sheet or plate shaped basic material. In the known blanking process and device at least the 2D contour of the metal part is shaped by pressing a correspondingly shaped blanking punch against and through the basic material, which basic material is clamped between a blanking die and a blank holder of the blanking device. The blanking die and the blank holder thereto define a respective cavity that is shaped to accommodate the blanking punch. An edge of the blanking die defining the contour of the cavity thereof, carves into and finally completely cuts through the basic material, as such basic material is progressively pressed into the cavity by the movement of the blanking punch relative to the blanking die.

Description of the Related Art

In the known blanking process and device, many factors such as a chamfering the cutting edge of the blanking die, a clearance between an outer contour of the blanking punch and an inner contour of the blanking die defining the cavity, the pressing force exerted by the blanking punch, the thickness and mechanical properties of the basic material, etc., each have their respective influence on the blanking process result, e.g. in terms of the shape accuracy and/or surface quality of the blanked parts.

In order to increase a production rate with such known blanking process, it is conceivable to provide the blanking device with multiple blanking punches and corresponding blanking dies, i.e. with multiple blanking stations, arranged in parallel, which blanking stations are activated by a single ramp of the blanking device. In this case, several blanked parts are formed, corresponding to the number of blanking punches, with each stroke of the ramp of the blanking device. However, the dimensions of the blanking device and thus the number of blanking stations therein are limited.

The above-described blanking process and blanking device are for example used in the manufacture of individual lamina for a laminate, such as rotor and/or stator lamina stacks for electric motors, as described in the U.S. Pat. No. 4,738,020, or transformer core laminates. In relation to this and other known applications of blanked parts, it may be a technical desire to produce the individual blanked parts with a small thickness by using basic material of such small thickness. For example in case of the said electric motor stator or rotor stack, the electric efficiency of the electric motor is, at least to a certain extent, inversely proportional to the thickness of the basic material, i.e. of the individual rotor/stator lamina. However, in practice, a minimum required thickness applies to the basic material in the blanking process. Otherwise, the basic material may be too thin for the proper handling thereof, e.g. may deform when being supplied to the blanking device. Also, a (too) thin basic material may result in the unwanted deformation of the blanked part, such as a stretching or a local thinning thereof, by the force exerted by the blanking punch. Finally, manufacturing economics plays a limiting role as well. After all, the thinner the individual lamina is, the more lamina have to be manufactured to build a laminate stack of certain height.

SUMMARY OF THE INVENTION

The present disclosure aims to improve upon the known blanking process and blanking device in terms of the minimum thickness of the blanked parts that can be obtained therewith.

According to the present disclosure, such aim is realised with the process for blanking metal parts in accordance with the claim 1 hereinafter. According to the present disclosure, the blanking device is supplied with layered basic material, i.e. basic material that comprises two or more individual, but preferably identical layers that are mutually stacked. Furthermore, in the blanking device, the layered basic material is firmly clamped from both sides thereof between the blanking punch and the counter punch of the blanking device in addition to a clamping force exerted by and between the blanking die and the blank holder, to press and hold the individual layers thereof together when these are moved relative to the blanking die.

Surprisingly, the surface quality and/or shape accuracy of the cut side faces of the thus simultaneously produced blanked parts is high, in particular high enough not to require further mechanical processing, possibly with the exception of a deburring process for removing blanking burrs.

It is noted that the novel blanking process according to the present disclosure can also be applied to favourably increase the production rate of a process chain wherein it is applied, i.e. regardless of the thickness of the basic material applied therein. In fact, also in case of the manufacture of lamina for electric motor rotor and/or stator lamina stacks, the simultaneous blanking of layered basic material, increases the production rate of the blanking device, in addition to allowing the (further) decrease of the thickness thereof vis-à-vis the state of the art.

It is further noted that the use of the counter punch is known per se in blanking technology and is generally referred to as fine-blanking. However, since the production or stroke rate of the fine-blanking process is inherently slower than that of the standard blanking process, it is not considered an economically viable option for the manufacture of stator/rotor lamina. However, by the blanking of the layered basic material in accordance with the present disclosure, the production rate of the fine-blanking process is favourably increased. Furthermore, according to another insight underlying the present disclosure, the production rate of the standard blanking process actually decreases for larger sized blanked parts. In particular, the above-mentioned limitation of the standard blanking process in terms of the minimum thickness of the basic material (to ensure the proper handling of the basic material and to avoid the deformation of the blanked part) is exacerbated as the size of the blanked part becomes larger. In practice, the production rate that is achievable with the novel blanking process according to the present disclosure can thus even overtake a maximum production rate of the standard blanking process depending on the size of the blanked part. In particular, when the size of the blanked part is approximated by the diameter of a (smallest) virtual circle fitted around, i.e. circumscribing the blanked part, a critical diameter Dc is found for such circle in relation to the number n of individual layers of/in the layered basic material and a thickness T thereof. At or above such critical size, the novel blanking process according to the present disclosure is typically more economical than the standard blanking process. The said critical size Dc can be approximated by: $Dc/T \geq 1250/n$.

In yet a further elaboration of the process for blanking metal parts in accordance with the present disclosure, it is noted that several boundary conditions apply. In particular, the process for blanking metal parts in accordance with the present disclosure can favourably make use of layered basic material that is composed of 2 up to 12 or more individual layers, more preferably 4 to 6 layers. Furthermore, the process for blanking metal parts in accordance with the present disclosure can favourably make use of layered basic material that is composed of individual layers, each having a thickness in the range from 0.5 mm down to 0.05 mm or less, more favourably between 0.3 and 0.1 mm. In particular, the layered basic material used is preferably composed of 4 to 6 layers of between 0.1 and 0.2 mm thickness. The overall thickness of the basic material should preferably not exceed 2 mm to avoid excessive deformation of the individual layers thereof. For the same reason, a thickness of the individual layers should preferably not be less than 0.1 mm. Moreover, if this layer thickness exceeds 0.5 mm, the standard blanking process typically becomes the more economical choice. Furthermore, the said clamping force applied between the blanking punch and the counter punch in accordance with the present disclosure preferably amounts to more than 0.5 N/mm2, in particular has a value in the range from 0.7 to 7 N/mm2 for basic material made of steel.

In yet a further elaboration of the process for blanking metal parts in accordance with the present disclosure, a mutual shifting and/or sliding of the individual layers of/in the layered basic material during blanking is suppressed, whereby the result of the blanking process in terms of the accuracy and/or quality of the blanked parts can be improved. Such relative movement can be suppressed by realising a high friction between the individual layers or by providing an interconnection there between. Within the context of the present disclosure, the said high friction corresponds with a (Coulomb) coefficient of friction of more than 0.75, preferably around 1. These friction values can be realised by cleaning, i.e. by washing-off lubricant, grease, etc., of the individual layers before these are stacked and/or by providing these with a high surface roughness. In particular, such high surface roughness is applied during the rolling of the individual layers of basic material by using a rolling roll with an equally rough or profiled outer surface. Generally speaking, the said individual layers can be roughened by creating small pits and/or crevasses in the surface thereof by any known suitable process, such as evaporation by laser beam and (coarse) grinding. Within the context of the present disclosure, the said high surface roughness corresponds with a (ISO standard) Ra surface roughness value (arithmetic average centre line deviation) of more than 7.5 micron, preferably more than 10 up to 25 micron.

The said relative movement between the individual layers can alternatively or additionally be suppressed by interconnecting these, i.e. joining these together prior to the blanking of the blanked parts. Such interconnection can for instance be realised by (spot) welding the individual layers together after these are stacked and/or by providing each individual layer with a recess and a corresponding protrusion prior to the stacking thereof, such that in the layered basic material the protrusion of a first layer is pressed into and locks with the recess of an adjacent layer. Alternatively or additionally, an adhesive can be provided between the individual layers of the layered basic material prior to the stacking thereof. In this respect it is noted that, in case of lamina for electric motor rotors or stators and/or transformer cores, the basic material is known to be provided with a thin, electrically isolating layer, i.e. coating, with an adhesive property that is, however, activated only after blanking and stacking the lamina by heating the stack, i.e. by so-called curing. Such specific coating is known as bonding varnish (German: "Backlack"). According to the present disclosure, the curing of the bonding varnish is preferably carried out prior the blanking of the blanked parts. Furthermore, regardless of the type of adhesive provided, it is preferably provided with a minimal layer thickness, since it is loaded by shear stress. Within the context of the present disclosure, the said high minimal layer thickness of the adhesive corresponds with a layer thickness of 10 micron or less or of less than 10% of the thickness of the individual layers of the layered basic material. Preferably also, the shear strength and/or shear modulus of the adhesive is approximately equal to the shear strength and/or shear modulus of the basic material respectively.

Preferably according to the present disclosure, the layered basic material is supplied to the blanking device from a stock of basic material that is pre-assembled from a number of individual layers of basic material corresponding to the desired number of layers of basic material. This has the advantage that the layered basic material can be assembled from the individual layers of basic material in a smooth and/or continuous process. In this case, the said individual layers are subjected to minimal handling force only, at least in comparison with the simultaneous, but separate feeding of the individual layers of basic material directly to the blanking device. In this latter case, the strip of basic material is intermittently advanced in cadence with the blanking stroke, such that it thus subjected to comparatively high (acceleration/deceleration) forces. The layered basic material being able to withstand a much higher force in this respect than an individual layer thereof, in particular if the layers are interconnected.

BRIEF DESCRIPTION OF THE DRAWINGS

In the following, the blanking process and blanking device according to the present disclosure are explained further by way of example embodiments and with reference to the drawing figures, whereof.

DESCRIPTION OF THE PREFERRED EMBODIMENTS

Figure 1:
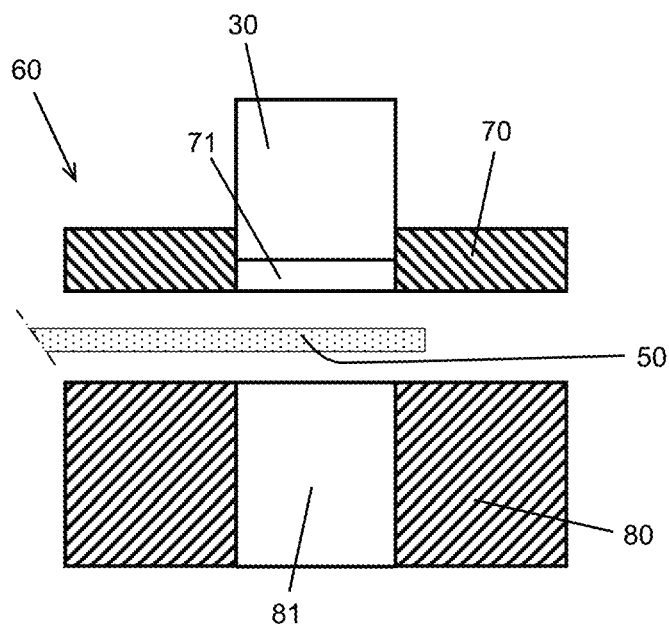
FIG. 1 schematically depicts, in the form of a cross section, the known blanking station of a blanking device with basic material being inserted therein.

FIG. 1 represents a simplified cross-section of a standard blanking station 60 of the known blanking device that is used to cut-out a part from a blank, such as a strip of basic material 50. The standard blanking station 60 includes a blanking punch 30, a blank holder 70 and a blanking die 80. The blank holder 70 and the blanking die 80 each define a respective cavity 71, resp. 81, wherein the blanking punch 30 is contained. In FIG. 1, the standard blanking station 60 is shown in an open state, wherein the blanking punch 30 is fully retracted into the blank holder 70 and wherein the blank holder 70 and the blanking die 80 are separated from one another, at least sufficiently for allowing the basic material 50 to be inserted and/or advanced there between.

Figure 2:
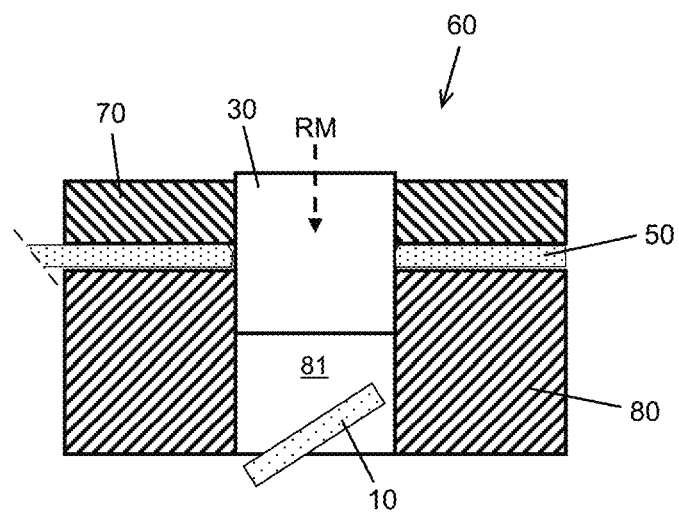
FIG. 2 schematically illustrates the known blanking process based on the depiction of the known blanking station of FIG. 1.

In the actual blanking stroke of the blanking device that is schematically illustrated in FIG. 2, first the blank holder 70 and the blanking die 80 are moved towards each until the basic material 50 is held in place there between. Then, the actual cutting out from the basic material 50 of a blanked part 10 takes place by the forced movement of the blanking punch 30 relative to blanking die 80, indicated by the dashed arrow RM, such that the punch 30 pierces through the basic material 50. Such relative movement RM is effected by means of an actuator of the blanking device, such as a hydraulically or mechanically operated ramp (not shown) acting on the blanking punch 30 of the standard blanking station 60, while the blanking die 80 thereof is held firmly in place, or vice versa. In the shown arrangement of the standard blanking station 60, the blanked part 10 falls downward out of the cavity 81 of the blanking die 80.

Figure 3:
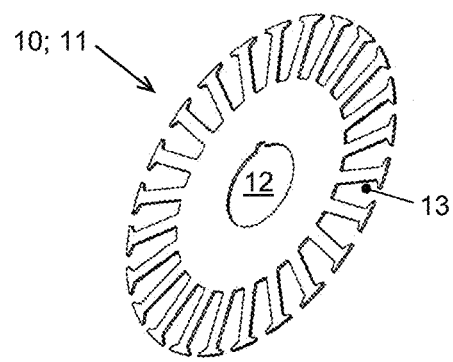
FIG. 3 is a perspective view of a typical blanked part, being a lamina for a stack of lamina used in a rotor of an electric motor.

FIG. 3 provides an example of a blanked part 10 produced with the aid of the known blanking device and process in the form of a round metal disc 11 with a central hole 12 and a series of recesses 13 arranged along its circumference. Both the outer and the inner contour of the disc 11 are formed, i.e. are cut out of the basic material 50 in a blanking process, either simultaneously in one cut or in a number of subsequent partial cuts in separate blanking stations 60 that are arranged in series in a direction of supply of the basic material 50 and that are simultaneously operated by the said ramp (not shown). The known blanking device may also be provided with a number of blanking stations 60 arranged in parallel, such that a number of blanked parts 10 is formed in each blanking stroke corresponding to the number of blanking stations 60 (not shown).

The particular type of disc 11 shown in FIG. 3 is used in a laminate or stack consisting of many such discs 11 for a rotor of an electric motor. In such rotor, the central hole 12 of the rotor discs 11 accommodate a shaft of the rotor and the said recesses 13 thereof accommodate conductive material, such as copper wire windings. An electrically isolating layer is typically provided between the individual rotor discs 11 in the stack to reduce so-called Eddy current losses, for example by coating at least one and preferably both sides of basic material 50 with electrically non-conductive layer. Typically, such coating is thermally active, such that, after blanking of the rotor or stator discs 11 and the subsequent assembly thereof into a rotor/stator stack, the coatings of the adjacent rotor or stator discs 11 in the stack can be activated by heat, i.e. cured, to mutually bond and thereby join the rotor or stator discs 11 to form an integral stack. This type of coating is known as bonding varnish or back lack.

It is known that the electric efficiency of an electric motor can be improved by reducing the thickness of the individual rotor discs 11, i.e. the lamina of the rotor laminate thereof, whereby Eddy current losses in particular are reduced. However, in practice, a minimum thickness applies for such discs 11 in terms of the manufacturability thereof. For example in this respect, the thinner the basic material 50, the more the blanked part 10, i.e. the rotor disc 11, will plastically deform in the blanking process under the influence of the force exerted by the punch 30, until the amount of deformation and/or lack of controllability thereof exceed what is acceptable for a given application of the blanked part 10.

According to the present disclosure, a further reduction of the thickness of the rotor disc 11, i.e. of a blanked part 10 in general, can be achieved with the novel blanking process that is illustrated in FIGS. 4A-4F. In the novel blanking process, a multi-layered basic material 51, composed of several, i.e. two or more mutually stacked individual layers 50, is supplied to a blanking station 90 of the blanking device, which blanking station 90 is provided with the blanking punch 30, the blank holder 70 and the blanking die 80, as well as with a counter punch 40 that is located in the cavity 81 of the blanking die 80 on the opposite side of the blanking punch 30. This particular type of blanking/blanking station 90 using a counter punch 40 is known per se, namely as a fine-blanking/fine-blanking station 90.

Figure 4A:
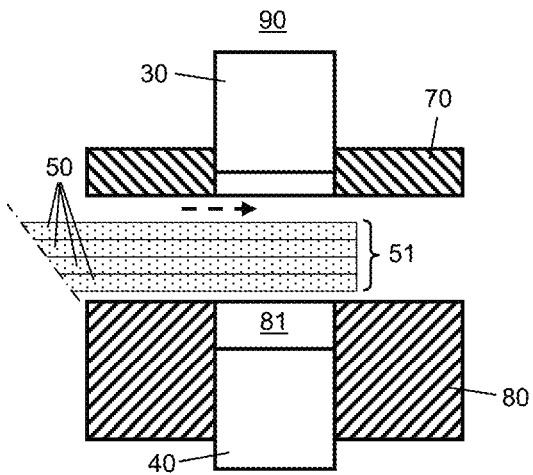
FIGS. 4A to 4F schematically illustrate a novel blanking process according to the present disclosure.

In FIG. 4A the fine-blanking station 90 is shown in a first open state, wherein the blanking punch 30 is fully retracted into the blank holder 70, wherein the counter punch 40 is fully retracted in the blanking die 80 and wherein the blank holder 70 and the blanking die 30 are separated to allow the (in the illustrated example) four layered basic material 51 to be advanced relative to the fine-blanking station 90.

Figure 4B:
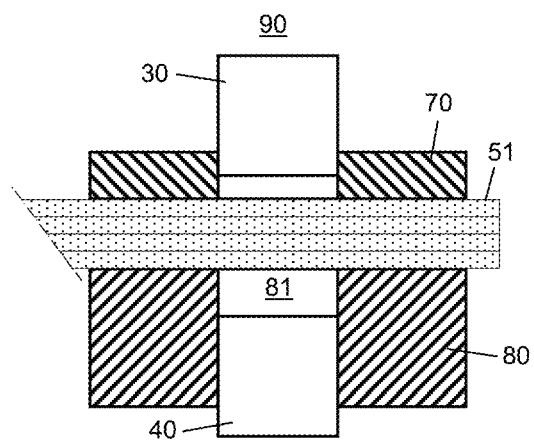

In FIG. 4B the fine-blanking station 90 is shown after the blank holder 70 and the blanking die 30 have been moved towards each other to clamp the four layered basic material 51 between them.

Figure 4C:
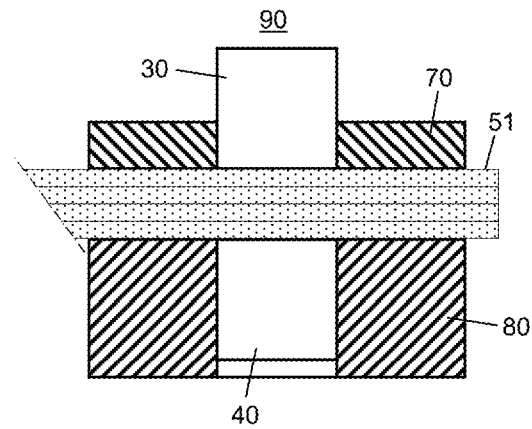

In FIG. 4C the fine-blanking station 90 is shown after the blanking punch 30 and the counter punch 40 have been moved towards each other to also clamp the four layered basic material 51 between them.

Figure 4D:
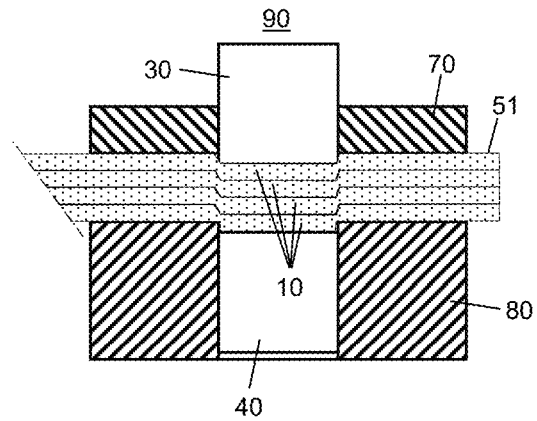
Figure 4E:
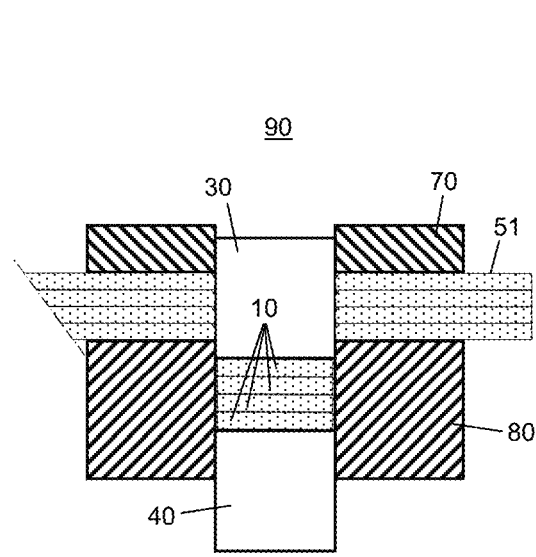

In FIGS. 4D and 4E the step of cutting out four blanked parts 10 from the four layered basic material 51 is illustrated. In particular in FIG. 4D the fine-blanking station 90 is shown during the cutting from the four layered basic material 51 of the four blanked parts 10 by the forced movement of the combination of the blanking punch 30 and the counter punch 40 relative to the blanking die 80. In FIG. 4E the fine-blanking station 90 is shown after the said four blanked parts 10 have been completely cut out, i.e. severed from the four layered basic material 51, but are still held between the blanking punch 30 and the counter punch 40.

Figure 4F:
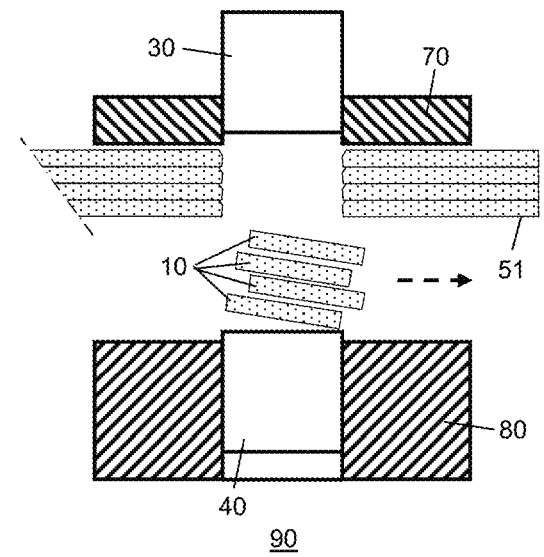

In FIG. 4F the fine-blanking station 90 is shown in a second open state, wherein the blanking punch 30 is fully retracted into the blank holder 70 and wherein the counter punch 40 protrudes from the blanking die 80 after pushing the two blanked parts 10 upwards out of the cavity 81 of the blanking die 80 to allow the extraction thereof from the fine-blanking station 90. After such extraction, the fine-blanking station 90 returns to its first open state shown in FIG. 4A etc.

Relative to standard blanking/the standard blanking station 60, the fine-blanking process/fine-blanking station 90 allows for a better surface quality and/or shape accuracy of the blanked parts 10, however, at the expense of a significantly lower stroke rate, i.e. of a reduced yield in terms of the number of blanked parts 10 that can be produced per unit of time. This significantly lower stroke rate of the fine-blanking station 90 relative to the standard blanking station 60 is a reason for the fine-blanking process previously being considered unsuitable for the economically feasible manufacture of relatively thin lamina, such as rotor and/or stator discs 11 for electric motors. However, according to an insight underlying the present disclosure, for larger sized blanked parts 10, the stroke rate of the standard blanking station 60 is increasingly limited by the (maximum) speed of advancement, i.e. feeding speed of the basic material 50 to the blanking station 60. Since the basic material 50 is intermittently advanced in cadence with the stroke rate of any blanking station 60, 90, it is subjected to acceleration and deceleration forces that are proportional to the weight of the basic material 50 and thus to the size of the blanked part 10. Therefore, at a certain, critical size of the blanked part 10, a maximum possible stroke rate becomes largely independent of the type of blanking process. Normally, such "breakeven size" of the blanked part 10 lies beyond what is typically applied in practice. However, when using the multi-layered basic material 51 in accordance with the present disclosure that is able to withstand higher forces, such breakeven size of the blanked part 10 assumes a practically relevant value. In fact, the number of blanked parts 10 produced per unit of time of the novel blanking process according to the present disclosure can even surpass that of the standard blanking process, at least for relatively thin parts 10 of relatively large size.

In relation to the blanking die 80 it is noted that in the conventional fine-blanking process, it is provided with a chamfered circumference edge for realizing the optimum blanking result, as is for example discussed in EP 1 677 924 A1. However, within the context of the novel blanking process according to the present disclosure, the blanking die 80 is provided with a sharp, approximately rectangular circumference edge for realizing the optimum blanking result, in particular for realizing that the blanked parts 10 (that are formed simultaneously in one stoke of the blanking station 90) are provided with mutually corresponding dimensions and shape as best as possible.

Figure 5:
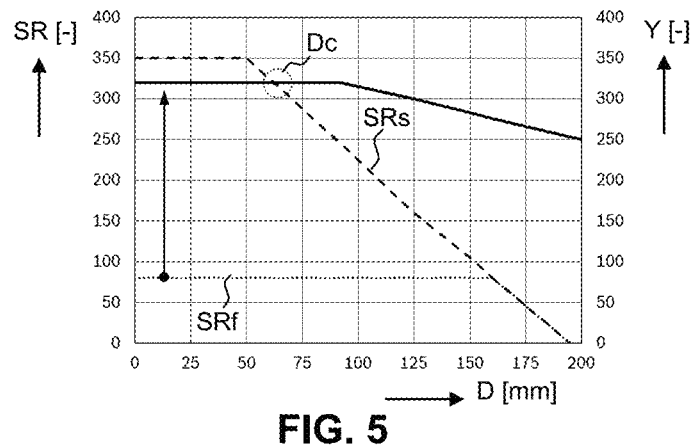
FIG. 5 is a graph wherein the manufacturing speed or stroke rate of the standard and of the novel blanking process are plotted versus a size of the blanked part.

The above aspects of the present disclosure are illustrated in the graph of FIG. 5. In FIG. 5, the left vertical axis represents the stroke rate SR of a blanking station 60, 90 in terms of a number blanking strokes per minute, the right vertical axis represents a yield Y of that blanking station 60, 90 in terms of a number of blanked parts 10 per minute and the horizontal axis represents a size of the blanked part 10 by the diameter D of a (smallest) virtual circle circumscribing it, corresponding to for instance the diameter of the rotor disc 11. In FIG. 5 the dotted line represents a typical stroke rate SRf of the fine-blanking process and the dashed line represents a typical stroke rate SRs standard blanking process. Even though the standard blanking stroke rate SRs decreases as the size D of the blanked part 10 increases, it remains well above the fine-blanking stroke rate SRf for the larger part of the graph. However, in accordance with the present disclosure, for a given stroke rate SR, the actual yield Y of blanked parts 10 of the novel blanking process is multiplied by the number of layers n of the multi-layered basic material 51, as indicated in FIG. 5 by the solid line for the four layered basic material 51 (n=4). In the illustrated example, the fine-blanking process becomes the better choice already at a critical size Dc of the blanked part 10 of about 60 mm.

It is noted that the values plotted in the graph of FIG. 5 are in fact applicable for a certain thickness/thickness range of the basic material 50, 51. In particular, the said critical size Dc of the blanked part 10 at which the fine-blanking process with doubled layered basic material 51 has a higher yield Y than the standard blanking process, decreases with decreasing thickness T of the blanked part 10. In FIG. 5, the arrow A indicates such decreasing critical size Dc that is also angled in the direction of a decreasing stroke rate SR, since also the stroke rate SR decreases with decreasing thickness T of the blanked part 10. According to the present disclosure, the said critical size Dc can be approximated by the equation: $Dc \geq (T/n)*1250$.

Another favourable feature of the novel blanking process that is apparent from FIG. 5 is that the horizontal part of the solid line extends to the right beyond the dashed and dotted lines. This is due to the circumstance that the four layered basic material is able to withstand higher forces than a single layer of basic material, in particular if the four individual layers thereof are joined together.

Figure 6:
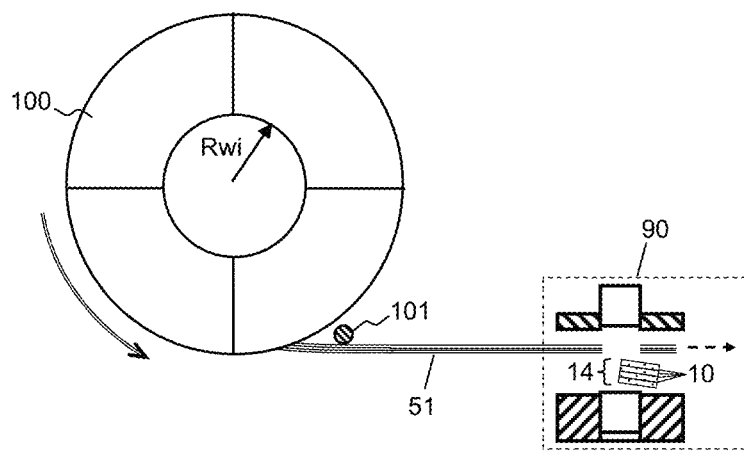
FIG. 6 schematically illustrates a first embodiment of a novel blanking device that is capable of carrying out the novel blanking process.

In FIG. 6 a novel blanking device is schematically illustrated that is arranged for and/or capable of carrying out the novel blanking process according to the present disclosure. More in particular, the novel blanking device differs from a conventional one by the provision of a stock spool 100 with the (in the illustrated example) four layered basic material 51 that is unwound and supplied to the blanking station(s) 90 of the blanking device. Preferably such unwinding and supply is effected by exerting a pulling force on the layered basic material 51 where it leaves the blanking station 90, as indicated in FIG. 6 by the dashed arrow. One or more support rollers 101 can optionally be provided between the stock spool 100 and the blanking station 90 to support and guide the layered basic material 51 between them.

Further in the example of FIG. 6, the four individual layers 50 of the layered basic material 51 can also be interconnected, e.g. glued together, in order to make the handling of the blanked parts 10 more easy, since these then effectively form a bigger, assembled work piece 14 composed of a stack of four, mutually connected blanked parts 10. Also in this case, the winding and unwinding of the stock spool 100 will be synchronised for all of the said four individual layers 50, provided that the inner winding radius Rwi of the stock spool 100 is large enough to allow for elastic deformation of the connection means, e.g. glue, and thus to avoid delamination.

Figure 7:
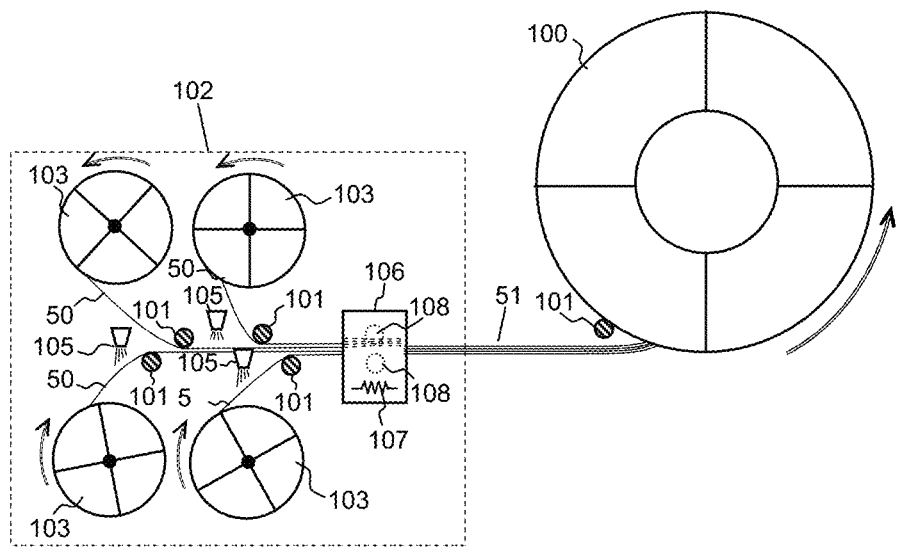
FIG. 7 schematically illustrates an assembly device for the assembly of a layered basic material to be used in the novel blanking process according to the present disclosure.

FIG. 7 schematically illustrates an assembly device 102 for the assembly of the (in the illustrated example) four layered basic material 51, in particular for preparing the stock spool 100 with the four layered basic material of FIG. 6, from individual strip-shaped layers of basic material 50. The assembly device 102 comprises four coils 103 of strip-shaped basic material 50 that are gradually de-coiled to supply respective strips of basic material 50 to be mutually stacked to from the four layered basic material 51. Support rollers 101 are provided between the coils 103 and the stock spool 100 to support, guide and/or mutually align the respective strips of basic material 50.

The assembly device 102 can optionally be provided with a number of applicators 105 for applying a coating to one or both of the main faces of a respective strip of basic material 50, as is also illustrated in FIG. 7. Such a coating can, for example, be non-conductive for electrically isolating the strips of basic material 50 from one another, as is preferred for laminates for electric motors or transformers, and/or it can be adhesive for mutually connecting these and thus also the blanked parts 10 to form the said bigger, assembled work piece 14. In this case, a heating station 106 with a heating element 107 can optionally be provided to the assembly device 102 for enhancing the drying and/or for curing the adhesive. Also in this case, the heating station 106 can optionally be provided with two cooperating compression rollers 108 to compress the layered basic material 51 for enhancing the mutual bonding thereof by the adhesive.

Figure 8:
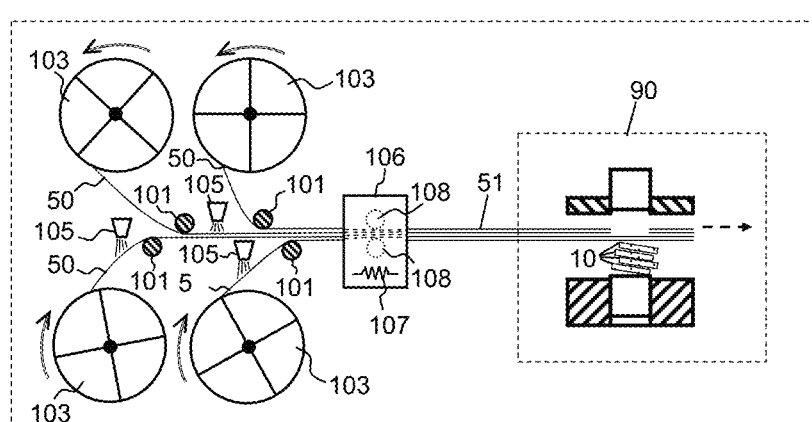
FIG. 8 schematically illustrates a second embodiment of a novel blanking device that is capable of carrying out the novel blanking process; and whereof FIG. 9 provides examples of metal parts obtained with the novel blanking device and the novel blanking process according to the present disclosure.

Preferably the four layered basic material 51 is assembled stepwise, i.e. layer-by-layer, for example by arranging four support rollers 101, i.e. one per coil 103, in series, at least as seen in the direction of movement of the basic material. After stacking, the four layered basic material 51 is either wound, i.e. coiled-up on the stock spool 100, as illustrated schematically in FIG. 7, or it is directly supplied to a blanking station 90. In this latter embodiment, the assembly of the layered basic material 51 from a number of coils 103 of strip-shaped basic material 50 is thus a part of the blanking device itself, as schematically illustrated in FIG. 8.

Figure 9:
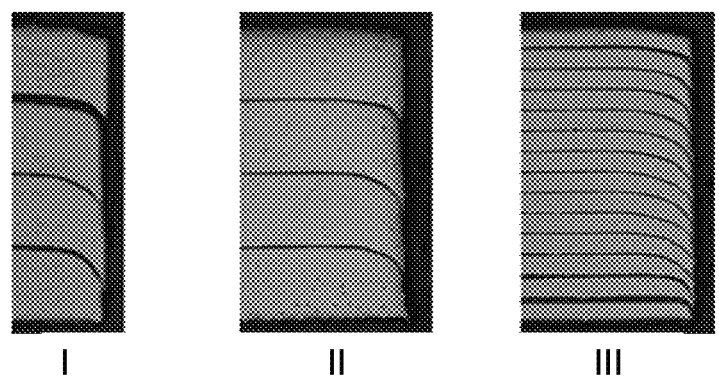

FIG. 9 provides three examples of blanked, metal parts 10 obtained with the novel blanking device and the novel blanking process according to the present disclosure. In FIG. 9, example I shows the cut edges of a stack of four blanked parts 10 obtained from four layered basic material 51 whereof the individual layers were not joined, bonded or (inter-)connected and with a layer thickness T of 0.35 mm, example II shows the cut edges of a stack of four blanked parts 10 obtained from four layered basic material 51 whereof the individual layers are bonded together by an adhesive and example III shows the cut edges of a stack of fourteen blanked parts 10 obtained from basic material 51 with fourteen individual layers having a layer thickness T of 0.10 mm bonded together. From these examples I, II and III it appears that a width dimension of the blanked parts 10 is in each case accurately formed. Further, comparing examples I and II, it appears that a deformation of in particular the side edges of the blanked parts 10 is less when the individual layers of the layered basic material 11 are bonded together, compared to when these are not joined together. Further, comparing examples II and III, it appears that an deformation of in particular the side edges of the blanked parts 10 is more or less independent of the thickness of the individual layers of the layered basic material 11, such that a relative deformation increases when the thickness of the individual layers decreases.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. A process for fine-blanking of metal parts (10; 11) for a laminate of such metal parts (10; 11), comprising the steps of:
    placing and clamping a multi-layered basic material (51) composed of at least 2 and at most 12 mutually stacked individual layers (50) partly between a blanking die (80) and a blank holder (70) and partly between a blanking punch (30) and a counter punch (40), the individual layers (50) each having a thickness in a range between 0.5 mm and 0.05 mm; and
    performing the fine-blanking by moving the blanking punch (30) and the counter punch (40) relative to the blanking die (80) and the blank holder (70) over a distance corresponding to at least a thickness of the multi-layered basic material (51), while exerting a clamping force on the multi-layered basic material (51) by and between the blanking punch (30) and the counter punch (40), whereby plural blanked parts (10; 11) are cut and separated from the multi-layered basic material (51), the blanked parts (10; 11) being a laminate.

2. The fine-blanking process according to claim 1, wherein the individual layers of the multi-layered basic material (51) are provided with an (ISO-standard) Ra surface roughness of more than 7.5 micron.

3. The fine-blanking process of claim 2, wherein the multi-layered basic material is provided with the (ISO-standard) Ra surface roughness of more than 10 up to 25 micron.

4. The fine-blanking process according to claim 2, wherein a size of the blanked parts (10) is approximated by a diameter D, which diameter D satisfies the relationship $D \geq (T/n)*1250$ with T representing the thickness of each of the individual layers of the multi-layered basic material (51) and n representing the number of layers of the multi-layered basic material (51).

5. The fine-blanking process according to claim 2, wherein the thickness T of each of the individual layers of the multi-layered basic material (51) has a value in a range between 0.3 and 0.1 mm.

6. The fine-blanking process according to claim 1, wherein the individual layers of the multi-layered basic material (51) are interconnected by an adhesive layer provided between adjacent individual layers of the basic material (51).

7. The fine-blanking process according to claim 6, wherein a size of the blanked parts (10) is approximated by a diameter D, which diameter D satisfies the relationship $D \geq (T/n)*1250$ with T representing the thickness of each of the individual layers of the multi-layered basic material (51) and n representing the number of layers of the multi-layered basic material (51).

8. The fine-blanking process according to claim 6, wherein the thickness T of each of the individual layers of the multi-layered basic material (51) has a value in a range between 0.3 and 0.1 mm.

9. The fine-blanking process according to claim 1, wherein a size of the blanked parts (10) is approximated by a diameter D, which diameter D satisfies the relationship $D \geq (T/n)*1250$ with T representing the thickness of each of the individual layers of the multi-layered basic material (51) and n representing the number of layers of the multi-layered basic material (51).

10. The fine-blanking process according to claim 9, wherein the thickness T of each of the individual layers of the multi-layered basic material (51) has a value in a range between 0.3 and 0.1 mm.

11. The fine-blanking process of claim 1, wherein the individual layers are essentially identical.

12. The fine-blanking process of claim 1, wherein the number of individual layers n of the layers of the multi-layered basic material has a value in a range between 4 and 6.

13. The fine-blanking process of claim 12, wherein the thickness T of each of the individual layers of the multi-layered basic material (51) has a value in a range between 0.3 and 0.1 mm.

* * * * *